(12) United States Patent
Davenport

(10) Patent No.: US 6,901,536 B2
(45) Date of Patent: May 31, 2005

(54) SERVICE QUALITY MONITORING SYSTEM AND METHOD

(75) Inventor: Benjamin P. Davenport, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 724 days.

(21) Appl. No.: 10/005,636

(22) Filed: Dec. 3, 2001

(65) Prior Publication Data

US 2002/0198976 A1 Dec. 26, 2002

Related U.S. Application Data

(60) Provisional application No. 60/293,441, filed on May 24, 2001.

(51) Int. Cl.[7] .............................................. G08F 11/00
(52) U.S. Cl. .......................... 714/39; 714/15; 714/39; 714/47; 714/48; 709/224
(58) Field of Search ............................. 714/15, 39, 47, 714/48; 709/224

(56) References Cited

U.S. PATENT DOCUMENTS

| | | | |
|---|---|---|---|
| 5,247,517 A | * 9/1993 | Ross et al. ................... | 370/452 |
| 5,379,406 A | * 1/1995 | Wade .......................... | 703/21 |
| 5,958,009 A | 9/1999 | Friedrich et al. | |
| 6,405,327 B1 | * 6/2002 | Sipple et al. .................. | 714/39 |
| 6,560,647 B1 | * 5/2003 | Hafez et al. ................ | 709/224 |

* cited by examiner

Primary Examiner—Krisna Lim
(74) Attorney, Agent, or Firm—Shook, Hardy & Bacon, L.L.P.

(57) ABSTRACT

The present invention enables a software manufacturer to gain prompt, precise and comprehensive knowledge about how customers actually use a software program. The present invention is accomplished by using an instrumented application, or software program that has been adapted to measure predetermined parameters about the usage, performance or status of a local computer system while in operation. Upon execution, the instrumented application initiates an instrumentation session, measures predetermined parameter(s), obtains a value and stores the parameter(s) and the value as a data point on the computer system. All of the data points collected within a session are saved in a session file on the computer when the instrumentation session ends. The invention then attempts to transmit the session file to a server environment for further processing to summarize the statistical information received so that the software manufacturer can better know how its software product are actually used across a user population potentially numbering in the millions.

41 Claims, 10 Drawing Sheets

SERVICE QUALITY MONITORING SYSTEM AND METHOD

CROSS-REFERENCE TO RELATED APPLICATION

This patent application claims priority from the provisional application filed May 24, 2001, bearing Ser. No. 60/293,441.

FIELD OF USE

This invention relates to computer software and more particularly to a method for automated collection and analysis of data concerning the usage, performance and status of a computer system.

BACKGROUND OF THE INVENTION

The continued popularity of a product often demands that product manufacturers conduct ongoing product improvement. Central to effective product improvement is data on how consumers actually use the product. Various methods exist for attempting to obtain this information. For many products, it is common to employ a group of people, known as a "focus group," whose members are asked to use the product and provide specific comments to the manufacturer either verbally or in writing. Focus group studies are helpful because they can often be conducted before a product, or an improved version thereof, is released to the general public. The manufacturer can thus consider pre-release refinements to the product. Following a product's release to the public, a manufacturer may also obtain information concerning a product's usage by, for example, monitoring calls to the manufacturer's customer service department. Similarly, the manufacturer can monitor consumer comments from various other sources in an attempt to address such comments in a future version of the product.

Effective product improvement has become particularly important for computer software products to remain competitive. The past twenty years have witnessed an exponential growth in the use of personal computers. Driving this popularity to a large extent has been the availability of computer software that users find appealing. At an early point, software for personal computers was largely character-based and employed a limited number of commands whose use could be generally predicted. Thereafter, personal computer software evolved to the now-familiar graphical user interface, such as that exemplified by the Microsoft Windows operating system products.

The shift to a graphical user interface provided many advantages for the user, such as simplifying the knowledge required to effectively use certain computer software. Graphical user interfaces also offered increased user flexibility regarding use and configuration of the computer. As a result, the permutations of individualized usage of personal computers multiplied. Software manufacturers have an increased need to predict and understand how users actually use a personal computer and the software thereon in order to make product improvements that are meaningful for a broad segment of a user population.

To address this need, computer software manufacturers have employed traditional product usage analysis techniques. For example, often a preliminary, or "beta," version software is made available to groups of users who use the software and provide comments to the manufacturer. As with products generally, this approach requires a software manufacturer to rely on users' descriptions of software usage. Information can also sometimes be obtained from customer support incidents relating to the software.

While this methodology is helpful in the software area for identifying some pre-release product problems, it does not always provide comprehensive feedback to the manufacturer about how consumers use the software. For example, if a user experiences difficulties with the software and does not communicate these to the manufacturer, the manufacturer can lose potential insights for product improvement. Moreover, if the software contains features that are not used by a significant user population, the manufacturer may have difficulty in learning of such potentially unnecessary features. In addition, it is often difficult for a manufacturer to precisely gauge the spectrum of hardware and telecommunication environments in which the software is actually used. Product capability could be enhanced by better targeting the software to the actual computing environments in which it is used.

In short, the feedback provided to a software manufacturer by traditional product analysis methods has often become too generalized. Particularly with respect to modern computer software, the feedback often fails to provide a comprehensive picture of hardware and software usage and hinders the quick improvement of software to meet users' demands.

As computer hardware and software usage grows, it is becoming increasingly important to obtain up-to-date performance and usage data from a statistically significant population of users. Traditional techniques are becoming less workable, particularly as users of a given software can now number in the tens of million. Moreover, the current approach leaves many informational gaps in communicating how users actually used a product. These limitations are likely to become more significant, particularly as Internet-enabled, embedded computerized devices proliferate, such as microprocessor-equipped home appliances and other common devices.

SUMMARY OF THE INVENTION

To address these and other needs, the present invention provides a method for enabling a software manufacturer to record a set of data points about a computer while it is executing an application. The data points contain measurements concerning a status, condition, action, event or other measurable property about the computer. The data point information is thereafter transmitted to a central computer for analysis so that the manufacturer can obtain timely and precise feedback about how its application is being used. The method of the present invention is thus well-suited to obtaining and processing computer usage information involving millions of computers.

The present invention is accomplished by executing on a local computer, such as one belonging to a customer, a software program that has been adapted to measure predetermined parameters about the usage, performance or status of the computer on which the application is running. Such an application is hereinafter termed an "instrumented application."The parameters to be measured are determined by the software manufacturer and could include information such as the processor speed of the computer system, the amount of its random access memory or the speed of the computer's Internet access. Upon execution, the instrumented application initiates an instrumentation session and obtains an identifier. The identifier is an alphanumeric or numeric value that identifies the local computer user or the local computer itself. The instrumented application then measures the predetermined parameter to obtain a value and stores a data point on the computer identifying the parameter and the value. The present invention contemplates data points that store a single value as well as a series of values. A single value data point records a numeric or alphanumeric value, such as the amount of the computer's random access memory (RAM). A series of values, or stream, data point contains a series of numeric or alphanumeric values whereby the order of the values within the stream indicates the order in which the events or other parameters occurred, such as a list of clickable links the user selected. Additionally, data points in either form may be supplied with a time stamp indicating the time at which the data point was measured. Parameters can be measured until the instrumentation session ends, which occurs when the user exits from the instrumented application or as otherwise provided by the software manufacturer.

When an instrumentation session ends, the identifier and the data points collected during that session are saved in a session file on the local computer. The method of the present invention then attempts to transmit the session file to an upload server computer for further processing. If the session file is transmitted, it is then deleted from the local computer; otherwise, the session file is retained for possible later attempted transmission.

Due to the potential volume of data from multiple instrumentation sessions on multiple computers, the method of the present invention provides that the session files from the instrumentation sessions are processed in a distributed server computing environment using queues. A session file is received on an upload server that examines each session file to determine whether it should be retained based on predetermined criteria. Retained data are written to a transfer file that is stored in a transfer file queue for transmission to a processing server. The processing server receives the transfer file, parses it to extract a predetermined subset of data points and loads the subset into a raw data database table. The raw data database table information is then summarized according to predetermined criteria and stored in a data warehouse for on-line analytical processing (OLAP) and reporting concerning the measured parameters.

The present invention thus enables a software manufacturer to gain timely, precise and comprehensive statistics about the usage of an application across the application's entire user population. This knowledge enables the manufacturer to quickly respond to actual customer usage and improve products to better facilitate actual usage. Additional features and advantages of the invention will be made apparent from the following detailed description of the invention which proceeds with reference to the accompanying drawings.

BRIEF DESCRIPTION OF DRAWINGS

The present invention is described in detail below with reference to the attached drawing figures, wherein.

DETAILED DESCRIPTION OF THE INVENTION

The present invention provides a system and method that allow a software manufacturer to more effectively determine and analyze how users actually use a computer application. In accordance with the method, a software manufacturer selects parameters it would like to measure concerning computer usage while the application is executing. Such parameters can include processor speed, Internet access speed, time spent using a given application and many other items. At appropriate locations in the source code for the application, the software manufacture inserts source code statements to measure the selected parameters concerning the computer and to obtain a value. As noted above, such an application is termed herein an instrumented application.

During execution on a local computer, the instrumented application initiates an instrumentation session and obtains an identifier, such as a globally unique identifier, for association with the instrumentation session. The identifier may correspond to the local computer user or the local computer itself. Alternatively, two globally unique identifiers may be obtained, one for the local computer user and another for the local computer itself. The instrumented application then measures each desired parameter. The parameter and the measured value are stored on the local computer, either in a buffer or in a temporary file, to create a set of data points for the instrumentation session. Parameters are measured until the instrumentation session ends, which occurs when the user exits the application or at another point as determined by the manufacturer. When the instrumentation session ends, the identifier and the set of data points are stored in a session file, which is transmitted to a remote computer or upload server. The upload server is configurable to accept only those session files that meet selected criteria. The content of accepted session files is written to a transfer file for transfer to a processing server via a network. After receiving the transfer file, the processing server parses the transfer file and loads the resulting data into a raw data table. The raw data table information is then summarized to produce a desired summary. The summary is loaded into a table and transmitted to a data warehouse server for analysis and reporting in an on-line analytical processing (OLAP) environment.

Having briefly described an embodiment of the present invention, an exemplary operating environment for the present invention is described below.

Exemplary Operating Environment

Figure 1:
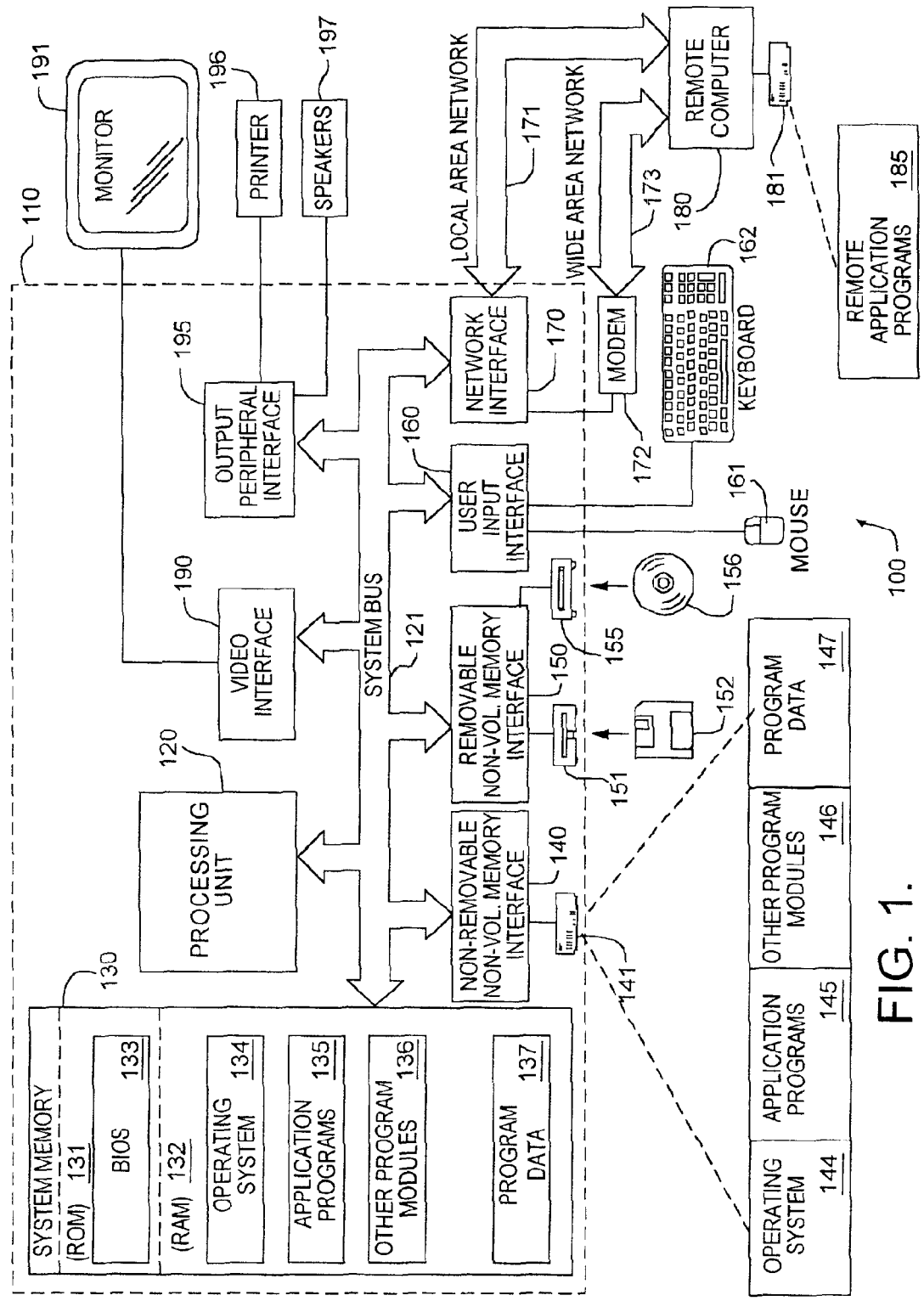
FIG. 1 is a block diagram of a computing system environment suitable for use in implementing the present invention on a local computer.

FIG. 1 illustrates an example of a suitable local computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 2:
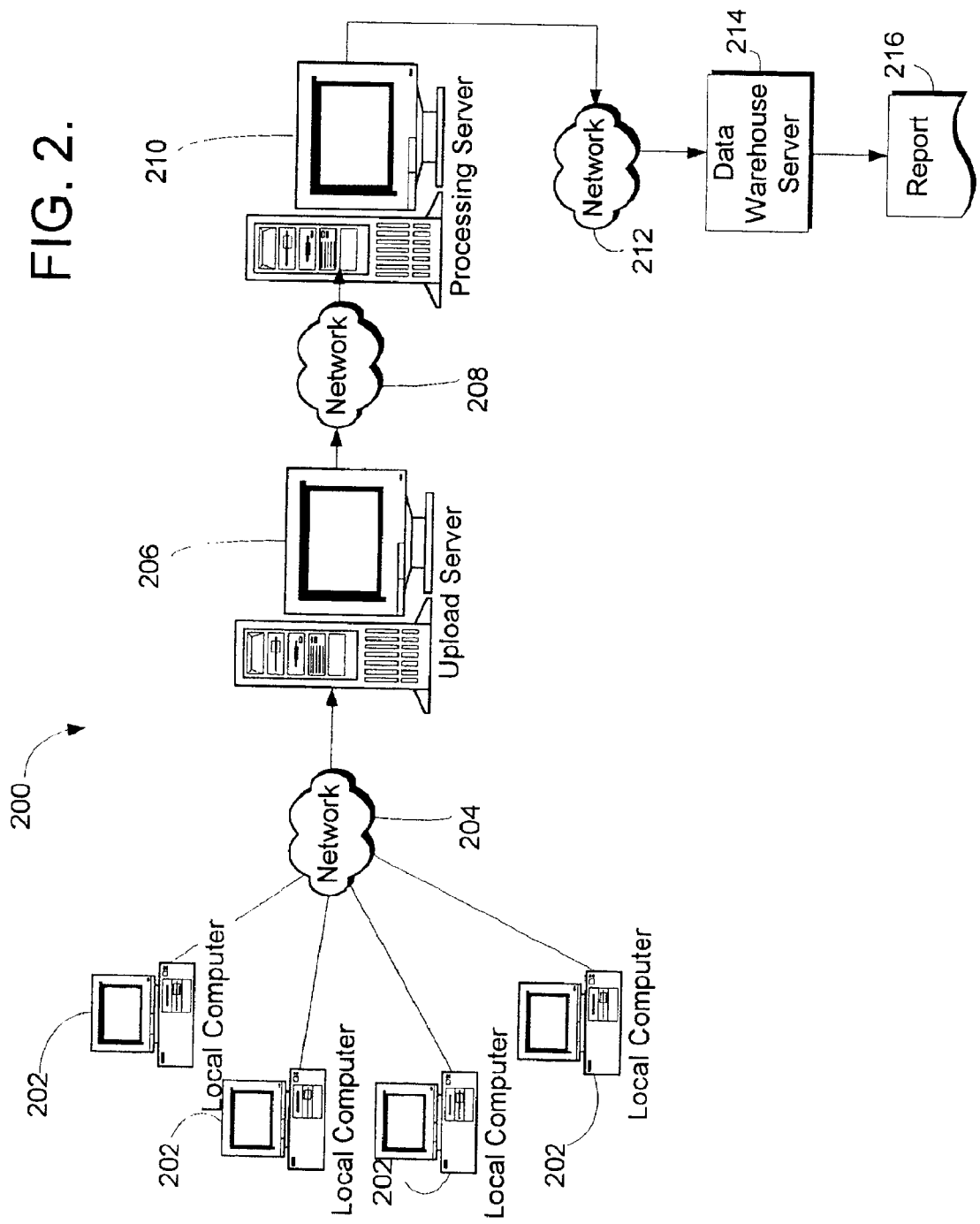
FIG. 2 is a block diagram of the invention in a networked computing system environment.

FIG. 2 illustrates another example of a suitable computer system environment 200 on which the invention may be implemented. The computer system environment 200 is only one example of a suitable computing environment and is not intended to suggest any limitation as to the scope of the use or functionality of the invention. Neither should the computing environment 200 be interpreted as having any dependency or requirement leading to any one or combination of components illustrated in the exemplary operating environment 200.

FIG. 2 illustrates an embodiment of the present invention in a networked computing system environment. A number of local computers 202 are shown that are configured to run an instrumented application. Local computer 202 may be a personal computer (PC) or another device having a microprocessor, such as a home appliance. The processes of the instrumented application are illustrated more specifically in FIG. 3. The instrumented application creates and stores a session file which can be transmitted to a remote computer or upload server 206 via a network 204. The network could be a local area network or a wide area network, such as the Internet. The upload server 206 receives session files and transfers the content of some or all of them to a processing server 210 via a network 208. Processing server 210 processes the session files and transfers information selected therefrom to a data warehouse server 214 via a network 212. A report 216 can then be generated from the information stored on data warehouse server 214. Details of these processes are more fully described below with reference to FIGS. 3–10.

Figure 3:
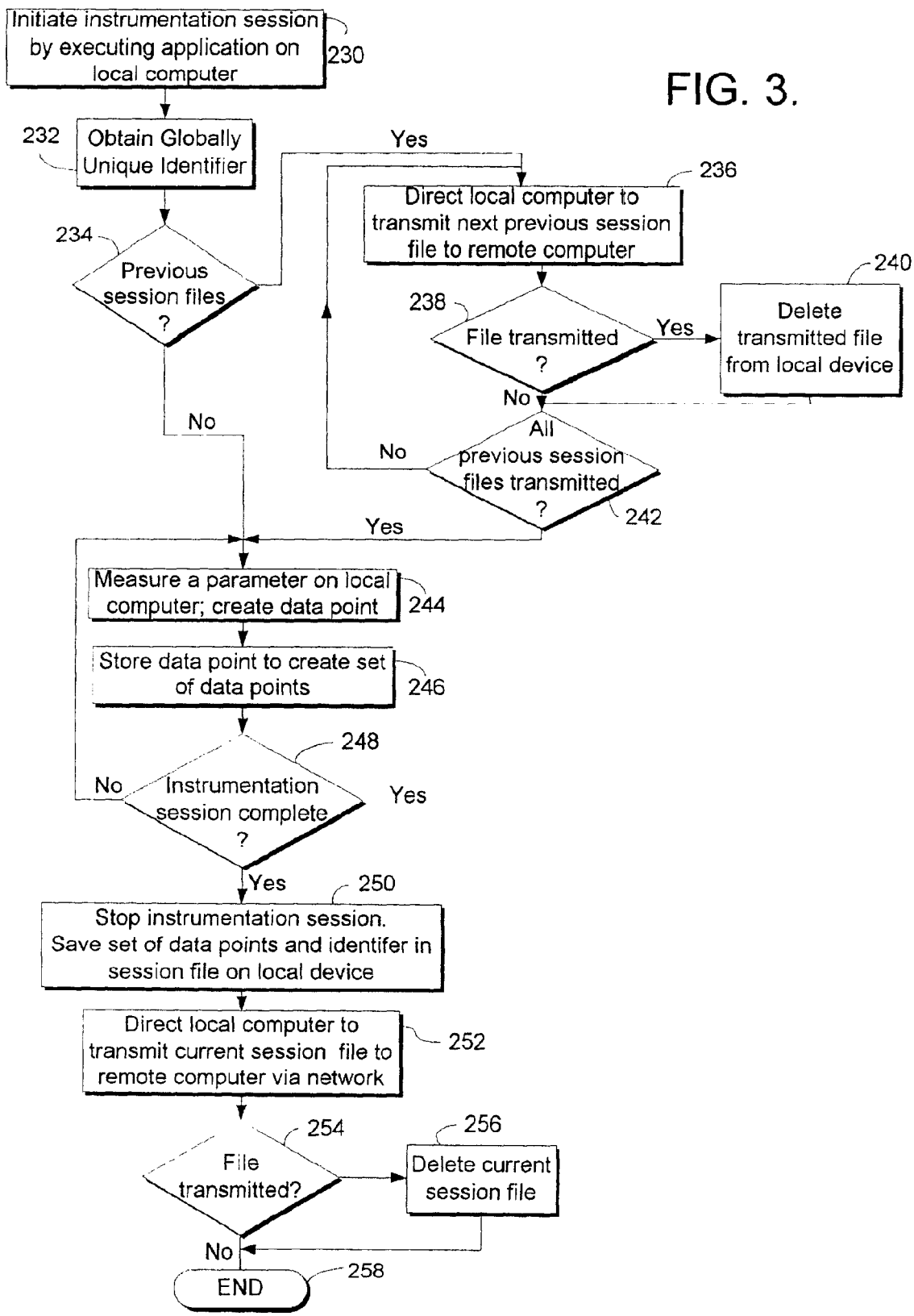
FIG. 3 is a flow chart illustrating a portion of an exemplary method for gathering information about a local computer.

With reference to FIG. 3, the method of the present invention initiates an instrumentation session at step 230 by executing on a local computer 202 an instrumented application for measuring at least one parameter concerning the local computer. The instrumentation session is the period of time during which the application is measuring parameters about the local computer. Initiation of the instrumentation session occurs when the application is ready to begin measuring parameters. The instrumentation session would normally be initiated when the instrumented application begins execution, although the session could well be initiated at a later point during execution of the instrumented application if the manufacturer wished to conduct measurements while only a certain section of the application was executing. As will be understood by those skilled in the art, in order to initiate an instrumentation session, the application would normally initialize variables to be used in recording values obtained by measuring the desired parameters. For example, the parameters and values to be measured might be stored in an array at the time parameters are measured and values obtained. During the initiation of the instrumentation session, this array could be declared and set to an initial value. The instrumentation session ends when no further parameter measurements are to be conducted for a given instrumentation session. Thus, the instrumentation session could end when the user exits the instrumented application or at another point designated by the manufacturer. Alternatively, when used in conjunction with an on-line service, such as the Microsoft Network, the instrumentation session could be initialized upon connection with the on-line service and ended when the on-line service session ends. In addition, the instrumentation session could begin when the application is executed and end if there are more than, for example, twenty minutes during which the user provides no input, even if the user has not yet exited the instrumented application. If the computer does not have an active connection to a network, an offline instrumentation session could be initiated that begins when the application begins execution and ends when an active connection to the network is established or execution of the application ends. An instrumentation session could likewise be initiated when a user, who is not currently a subscriber to an online service, attempts to register as a new user of the online service. Such a signup instrumentation session could end either when the registration process succeeds or fails, whereupon an on-line instrumentation session or an offline instrumentation session, respectively, could begin. A manufacturer could likewise choose to initiate an instrumentation session during the setup of the instrumented application and to end the instrumentation session when the setup process either succeeds or fails even though the user will not yet necessarily have exited from the application. As will be appreciated by those skilled in the art, many other points could be chosen during an application's execution to begin and end an instrumentation session, and the above examples are for illustration purposes and are not intended to limit the points at which an instrumentation session could be initiated or ended.

At step 232, the present invention obtains an identifier. The identifier is an alphanumeric or numeric value for identifying the source of the data collected during the instrumentation session. It can be generated by a variety of methods. As will be understood by those skilled in the art, the instrumented application could be programmed to generate or obtain an identifier based on user-supplied information. Alternatively, as will be understood by those skilled in the art, the application could obtain an identifier via a network from a remote computer maintained by the software manufacturer. Preferably, two identifiers are used, one to identify the user of the local computer and another to identify the local computer itself. The identifiers are preferably unique, such that no two users and no two computers share the same identifier. Such an identifier is termed a globally unique identifier. Moreover, once the identifier is obtained for a specific user or local computer, it is preferably reused during subsequent instrumentation sessions. Commercially available computer software may be used to generate an identifier, such as the Microsoft Windows API using the CoCreateGuid function.

After a user or a local computer has obtained an identifier, it could be stored on the local computer in a file or in the registry for a local computer running in the Microsoft Windows operating system environment. In this way, the step of obtaining an identifier need only require one communication with a remote computer for the purpose of obtaining the identifier and thereafter could reuse the same identifier by obtaining the stored identifier from the local computer directly the next time it is used. Thus, at step 232, the invention obtains a globally unique identifier using either the exemplary methods described above or another process as will be understood by those skilled in the art.

Control then passes to step 234, and the invention determines whether information collected during a previous instrumentation session was transmitted to a remote computer. If the previous session information was all transmitted, control passes to step 244, at which point the present invention measures a parameter on the local computer to obtain a value and to create a data point. The parameters measurable are determined by the information that the software manufacturer might wish to obtain concerning use of the application. By way of example, and not by way of limitation, a software manufacturer might measure parameters such as the following:

Whether the user is running the debug or retail version of the application.

The build number of the application.

The number of processors on the local computer.

The build number of the operating system running on the local computer.

The version number of the operating system running on the local computer.

The processor speed in megahertz running on the local computer.

The processor type.

The screen resolution of the video display associated with the local computer.

The user's time zone.

The number of minutes that the user has been on a specified network.

The number of unsuccessful attempts to access an on-line service.

The number of times a user entered an incorrect password while attempting to access an on-line service.

The number of times that a "bcc" was used in an outgoing mail message.

The number of times that a user clicked on a given user interface element, such as cut, copy, paste, etc.

The number of times that a user clicked on a banner ad while connected to the Internet.

As will be appreciated by those skilled in the art, the selection of the point in the instrumented application at which the measurement should occur is determined by the software manufacturer in accordance with the point during execution at which the software manufacturer wishes to have such information measured. Parameters that would not change during the execution of the instrumented application could well be measured at the start of execution. Other parameters would be measured throughout execution of the application, such as parameters that measure the number of times the user clicked on a given user interface element such as the copy, cut, paste or print toolbar buttons in an application, in order to obtain a cumulative count or average value. To adapt an application for the present invention, the software manufacturer would insert additional source code statements into the application's source code to measure the parameter at the point during execution when measurement of the selected parameter is desired. For example, a statement could be inserted at the logical beginning of the application's source code to measure the local computer's total random access memory and to obtain a value thereof shortly after execution begins.

After a parameter has been measured and a value obtained, the method of the present invention creates a data point at step 244. A data point contains a measurement concerning the local computer or the usage thereof. The data point identifies the parameter and the value obtained upon measuring that parameter. The data point may contain the measurement of a single value or multiple values for a given parameter. Thus, as will be appreciated by those skilled in the art, for an application written in the C++ programming language, the data point containing a single value could be implemented as a structure, such as:

```
typedef struct tagSINGLE_VALUE_DATAPOINT
{
    DWORD dwId      // identifier for parameter
    DWORD dwVal;    // value of parameter measured
    DWORD dwTicks   // elapsed time in milliseconds or
                       click counts since instrumentation
                       session initiated
}SQM_SINGLE_DATAPOINT
```

In the above example, the members of the structure are each of type double-word, which normally contemplates four bytes of memory. As will be understood by those skilled in the art, the structure members shown above could be of other data types, such as a string or alphanumeric type. This portion of the invention could be implemented by declaring an array of a type corresponding to the above structure. Each data point could then be added in the appropriate location of the array when a value was measured.

The present invention creates a data point by storing on the local computer an identifier for the parameter and the value obtained by measuring the parameter such as in an array as described above. A numeric identifier can be used for the parameter, rather than a text description thereof, to conserve memory and to expedite transmission of the resulting set of data points, although the present invention contemplates that the identifier and the measured value could be of any data type. For example, a parameter might be designated to identify the speed of the instrumented application's connection to the Internet. The numeric-type identifier for this parameter could be assigned by the software manufacturer and for purposes of illustration will be shown as "1." Thus, for a user having a 56,000 baud connection speed to the Internet, the members of the data point structure for this parameter measured, for example, 500 milliseconds after the instrumentation session was initiated, could be:

dwID=1 dwVal=56000 dwTicks=500

The data point could also be implemented as individual variables without reference to a structure construct, such as when the application to be instrumented is written in a programming language that does not support structures. Moreover, the dwTicks member or variable could measure other timing or sequence-related information, such as the number of user clicks up to the point at which the parameter was initially measured.

Alternatively, a stream, or series of parameter measurements, could be stored as a data point. For an application written in the C++ programming language, a structure such as the following could be used:

```
typedef struct tagSTREAM_VALUE_DATAPOINT
{
    DWORD dwId          // identifier for parameter
    DWORD cEntries      // number of entries in the stream
    DWORD dwVal[100]    // value of parameter measured
    DWORD dwTicks[100]  // elapsed time in milliseconds or
                           click counts since instrumentation
                           session initiated
}SQM_STREAM_DATAPOINT
```

In the above example, the structure members are each of type double-word. As noted above, the dwID member would store the identifier for a given parameter measured. The cEntries element would store the number of values in the stream. The dwVal[100] member would define an array containing the values measured for this stream. The value of the subscript in the declaration statement could correspond to the expected maximum number of values to be measured during a given instrumentation session. For example, a parameter might be designated to identify error messages issued by the application. The numeric-type identifier for this parameter could be assigned by the software manufacturer and for purposes of illustration will be shown as "2." Various error messages could likewise be assigned a numeric value. For example, a message noting that a hard disk was full could have a value of "1," and a message that the amount of random access memory (RAM) needed to run the application had exceed the available RAM could have a value of "2." Thus, for a user receiving error message 1 at 500 milliseconds following initiation of the instrumentation session, and then receiving error message 2 at 600 milliseconds following initiation of the instrumentation session, the structure members could have the following values:

dwID=2 cEntries=2 dwVal[0]=1; dwVal[1]=2;
dwTicks[0]=500; dwTicks[1]=600

The stream data point could also be implemented as individual variables without reference to a structure construct, such as when the application to be instrumented is written in a programming language that does not support structures. In short, as will be appreciated by those skilled in the art, the software manufacturer could implement the creation of data points in a variety of ways. In particular, the creation of stream data points contemplates a series of values of any data type, including alphanumeric and numeric. Although not required, subroutines or functions could be devised to assist in creating and updating data points. For example, data points that store a minimum, maximum or average value could be handled efficiently in this manner since such a data point could be set and reset during a single instrumentation session to obtain a desired final value.

At step 246, the created data point is stored on the computer in a designated area, such as in a memory buffer, to create a set of data points associated with the current instrumentation session and the identifier. Control then passes to step 248 to determine whether the instrumentation session has ended. Various times at which an instrumentation session could end are discussed above. If at step 248 the instrumentation session has not yet ended, control passes back to step 244 and the instrumented application continues in the loop defined by steps 244, 246 and 248, potentially obtaining additional data points, until the instrumentation session ends, such when the user exits the instrumented application. When the instrumentation session ends, step 248 detects this condition and control passes to step 250.

At step 250, the instrumentation session is complete, and the instrumented application ends the instrumentation session by ceasing to measure parameters for this instrumentation session. The application thereupon saves the set of data points along with the identifier in a session file on a local storage device accessible by the local computer. The local storage device may be the hard disk of the local computer, a removable memory device associated with the local computer or other storage medium associated with the local computer. The local storage device could likewise be a storage device to which the local computer has access via a network, such as on a LAN server. As will be appreciated by those skilled in the art, the session file could be further subjected to file compression to decrease transmission times.

The session file could further be named to facilitate management of session files awaiting transmission to a remote computer. For example, the session file could be stored as a file named SESSIONnnn.DAT, where -nnn- represents a number between a selected range, such as 1 and 10. The range can be selected to correspond to the maximum number of untransmitted session files to be stored at any one time on the local storage device. When a new session file is to be saved, the instrumented application would use an available file name. Thus, when the instrumented application seeks to store a current session file and, for example, the file SESSION001.DAT already exists, the instrumented application could save the current session file to SESSION002.DAT if no existing file had yet used this name. If the maximum number of stored session files had been reached, the instrumented application could delete the file containing the oldest session data and store the current session file, thereby conserving disk space.

After the session file has been stored, control passes to step 252 at which point the application directs the local computer to transmit the current session file to a remote computer or upload server 206 via a network, such as network 204. The network could be a local area network or a wide area network, such as the Internet. As will be understood by those skilled in the art, the transfer could be accomplished expeditiously using an HTTP POST or HTTPS POST request to the upload server 206 that transmits the data in binary form. The application determines at step 254 whether the session file was transmitted to the remote computer. If so, control passes to step 256 and the session file is deleted from the local storage device to conserve storage space. If the transmission of the current session file did not occur, it is retained on the local storage device so that when the next instrumentation session is started, a further attempt at transmission of this session file can be made. Regardless of whether the session file is transmitted, control passes to step 258 at which point processing is completed.

Returning to a further elaboration on step 234, the present invention may determine at step 234 that a session file from a previous instrumentation session failed to be transmitted to the upload server 206. Such a condition could be detected by scanning the directory on the local storage device in which session files are stored to determine whether any exist. If the previous session file failed to be transmitted, control passes to step 236 and the local computer is directed to transmit the previous session file to the remote computer or upload server 206 via a network, such as network 204. Control then passes to step 238 at which point the application determines whether the previous session file was transmitted. If so, control passes to step 240 at which point, to conserve storage space, the previous session file is deleted from the local storage device. If, on the other hand, at step 238, the transmission of the previous session file was unsuccessful, the previous session file is not deleted and control passes to step 242. At step 242, the present invention determines whether an attempt has been made to transmit all still-existing previous session files. If not, control returns to step 236 and repeats the steps described above until transmission of all previous session files has been attempted. When an attempt has been made to transmit all existing previous session files to the upload server 206, control passes from step 242 to step 244 and proceeds as discussed above.

Figure 4:
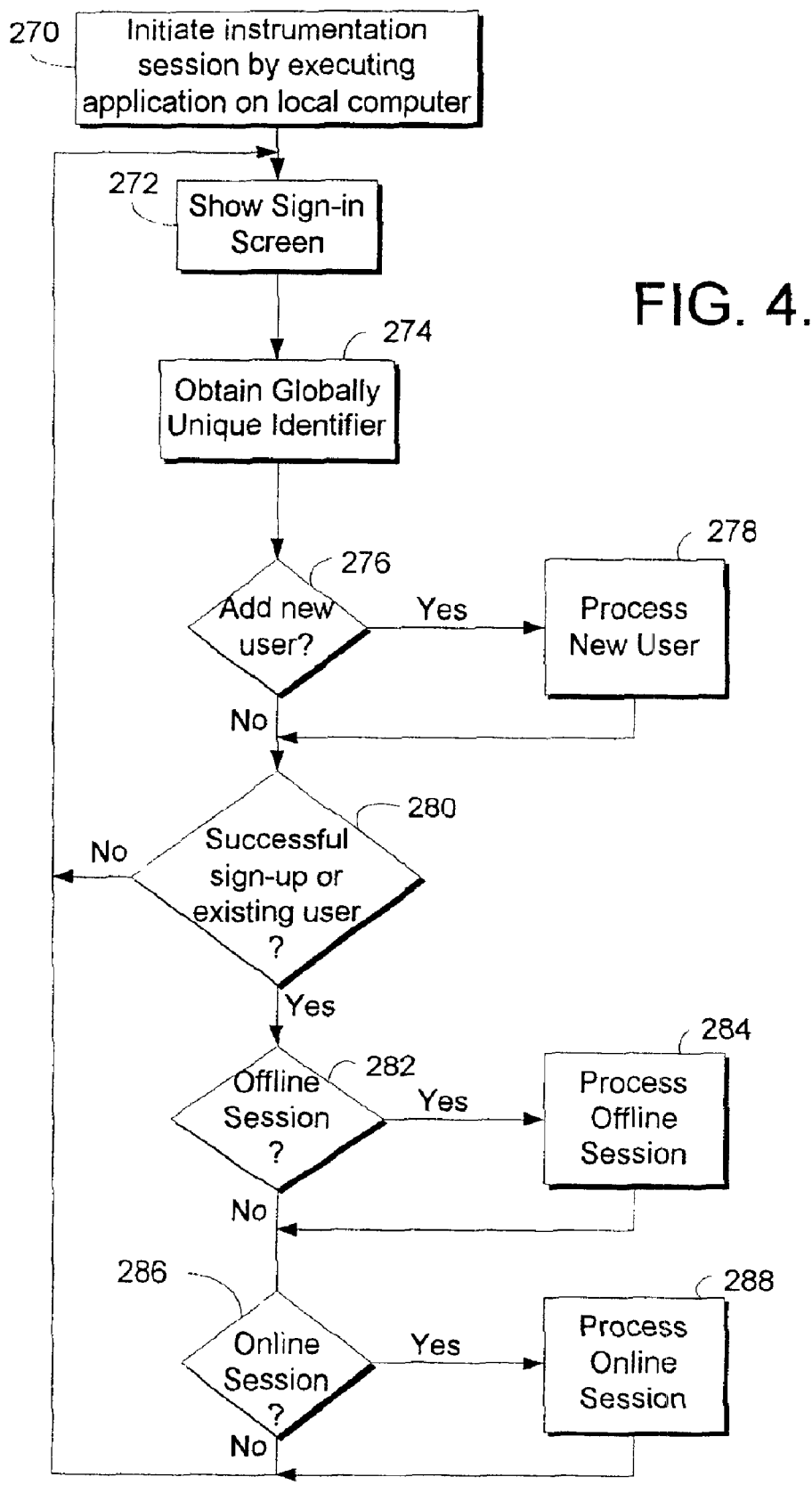
FIG. 4 is a flow chart illustrating a portion of an exemplary method for gathering information about a local computer being used in connection with an on-line service.

FIG. 4 illustrates another embodiment of the present invention for use in conjunction with an online service, such as the Microsoft Network and its dedicated client program. At step 270, the present invention begins by initiating an instrumentation session in the manner discussed above. At step 272, a sign on screen is displayed on the local computer monitor for the user to gain access to the online service via a network, such as the Internet. The user provides sign-on information, which is transmitted to the online service via the network.

Control then passes to step 274, and the present invention obtains an identifier in the manner discussed above for the instrumentation session. Control then passes to step 276 at which point the instrumented application determines whether the user is an existing subscriber to the on-line service by, for example, ascertaining whether the user was able to obtain access to the online service. If the user is not an existing user, control passes to step 278, the processes of which are illustrated in FIG. 5.

Figure 5:
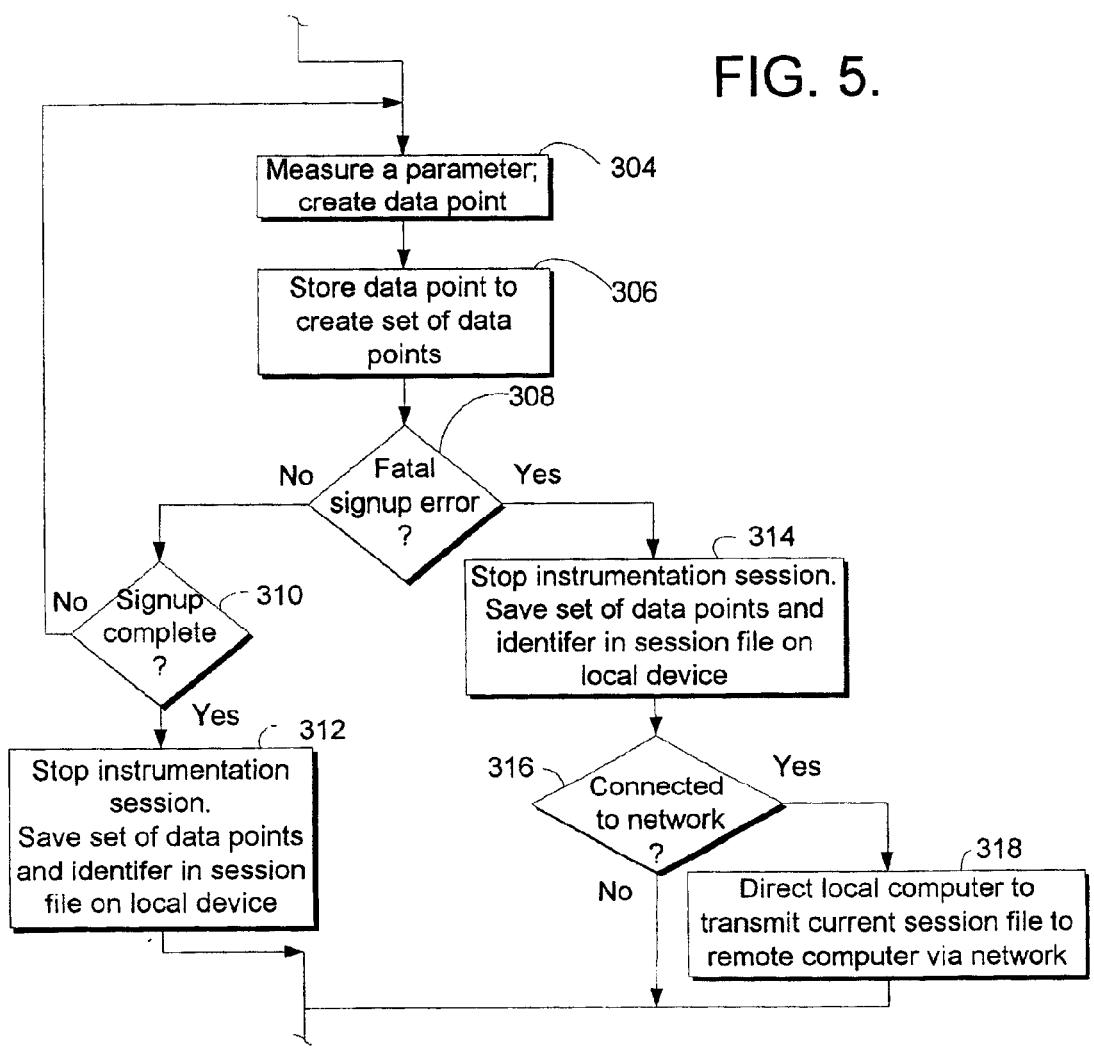
FIG. 5 is a continuation of the flow chart of FIG. 4.

FIG. 5 describes the method of the present invention for initiating an instrumentation session while a user is attempting to subscribe to an online service. With reference to FIG. 5, during the subscription or signup process, at step 304, the instrumented application executing on the local computer 202 measures a parameter and creates a data point in the same manner as discussed above in conjunction with step 244. Control then passes to step 306, at which point the instrumented application stores the data point to create a set of data points in the manner discussed above in conjunction with step 246.

Control then passes to step 308 at which point the instrumented application determines whether an error during the subscription process has occurred. If an error has occurred, control passes to step 314, and the instrumentation session ends. The application saves the set of data points and the identifier in a session file on the local storage device as described above in conjunction with step 250. Control then passes to step 316, and the instrumented application determines whether a network connection exists, such as a connection to the Internet. If such a connection exists, control passes to step 318, and the instrumented application directs the local computer to transmit the current session file to the remote computer or upload server 206 via a network 204. If no such connection exists, control passes to step 280 shown in FIG. 4.

If on the other hand at step 308 no error has yet occurred in the subscription process, control passes to step 310 at which point the application determines whether the signup process is complete. If the signup process is not yet complete, control returns to step 304 and the instrumentation session continues. If the signup process is determined at step 310 to be complete, the signup instrumentation session is ended, and at step 312, the set of data points is saved in a session file on the local storage device in the manner as described above in connection with step 250. Control thereupon passes to step 280 in FIG. 4 to continue processing.

At step 280 in FIG. 4, the present invention determines whether the user either was successful in registering as a new user or is an existing user. If the user is neither a new nor an existing user, access to the online service is denied and control loops back to step 272 to provide the user with another opportunity to obtain access to the online service.

If at step 280, it is determined that the user is either a successfully registered new user or an existing user, control passes to step 282 where the invention determines whether the instrumentation session is to be conducted offline, such as when no network connection exists or can be obtained. If an offline session is to be processed, control passes to step 284, the processes of which are illustrated in FIG. 6.

Figure 6:
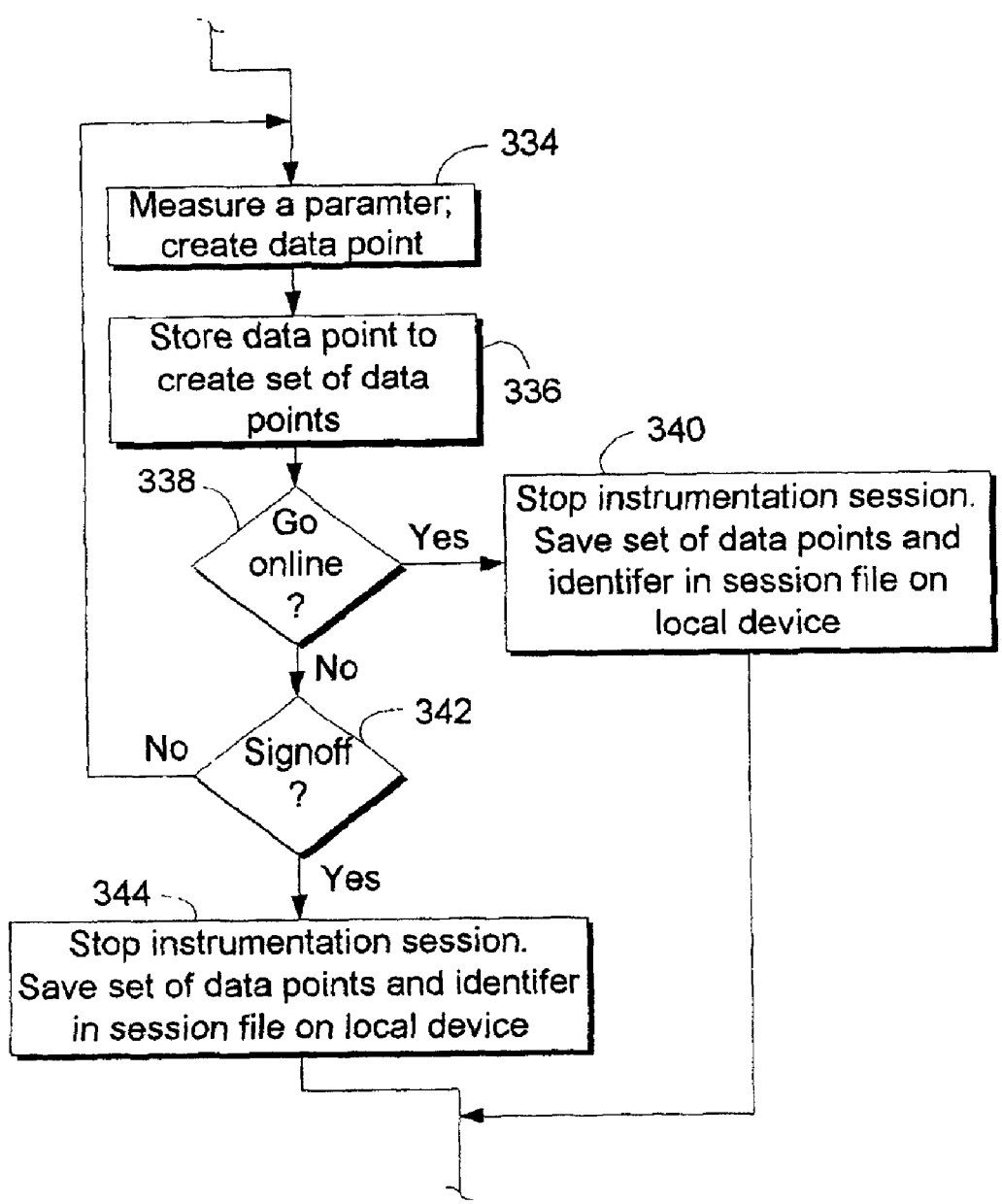
FIG. 6 is a continuation of the flow chart of FIG. 4.

With reference to FIG. 6, control passes to step 334 to measure a parameter and create a data point in the manner described above in connection with step 244. Control then passes to step 336 to store the data point to create a set of data points in the manner described above in connection with step 246. Control then passes to step 338 at which point the instrumented application determines whether access to the online service can be obtained. If such access can now be obtained, control passes to step 340, the offline instrumentation session ends and the set of data points is stored in a session file. If such access cannot be obtained, control passes to step 342 and the application determines whether the offline session has ended. If the offline instrumentation session does not end, control returns to step 334 for further processing. If the offline session ends, control passes to step 344, the instrumentation session ends and the set of data points and the identifier are stored in a session file in the manner described above in connection with step 250. Returning to FIG. 4, control thereupon passes to step 286.

At step 286, the instrumented application determines whether an online instrumentation session can be maintained by determining whether the local computer currently has an active session with the online service. If such access is available, control passes to step 288, the processes of which are illustrated in FIG. 3 and explained above. If an online session is not available, control returns to step 272 for further processing.

Figure 7:
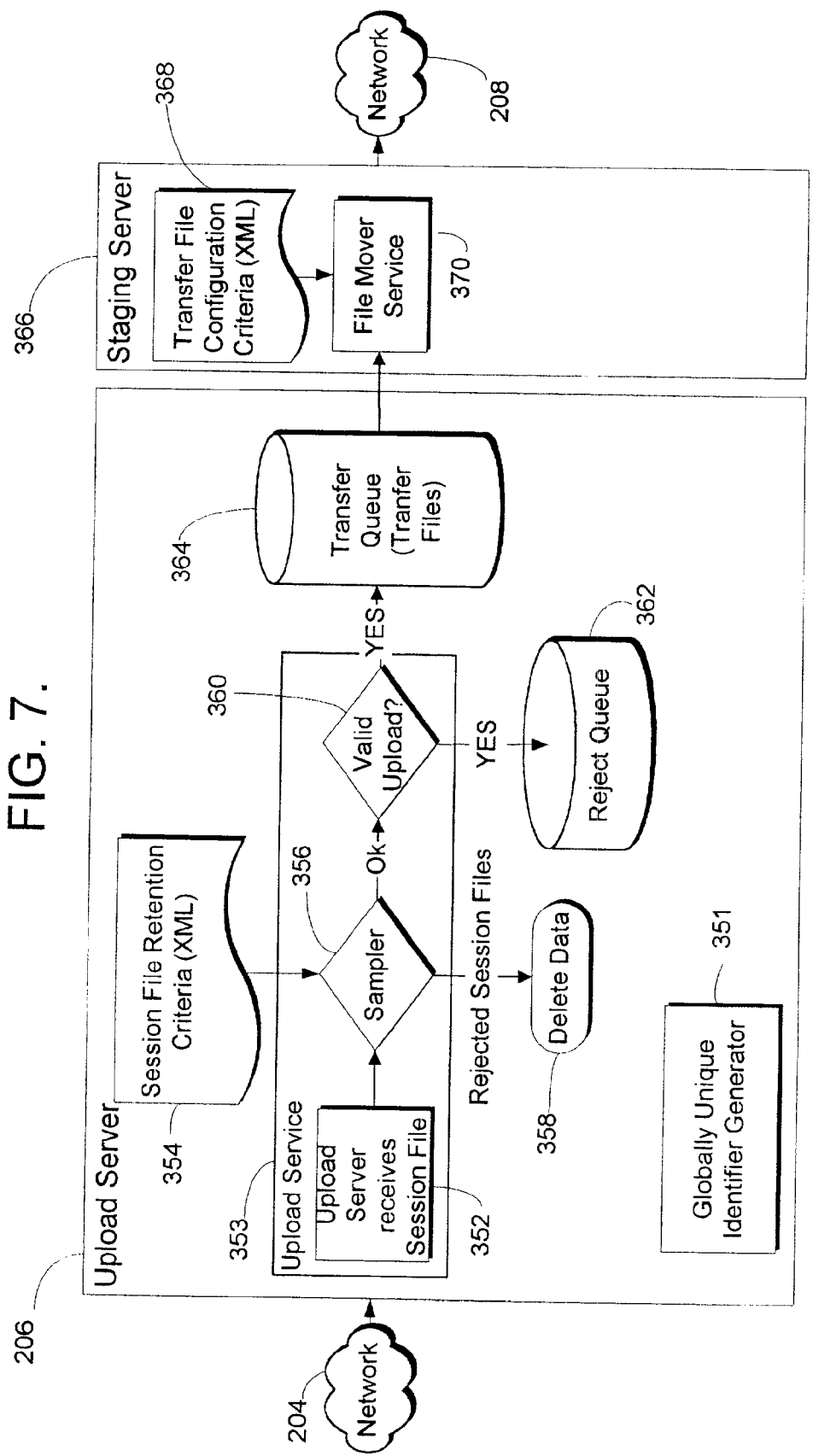
FIG. 7 is a schematic diagram and flow chart illustrating the processes of the upload server and staging server of the present invention.

With reference to FIG. 2, when the instrumentation session has been completed, the invention transmits the session file via the network 204 to an upload server 206, the processes of which are illustrated in FIG. 7. The upload server 206 receives session files transmitted from local computers 202, processes the files and then transmits the content of the processed session files via the network 208 to a processing server 210. The upload server, as will be appreciated by those skilled in the art, can be configured in a variety of ways to perform its function. It is important that the upload server be highly performant, scalable, robust and resistant to malicious attacks. Service outages should be avoided because of the potential for loss of instrumentation session data during an extended interruption in service. Thus, the upload server could be implemented on a data center-class Internet server, or server cluster, running, for example, the Microsoft Internet Information Server. As will be appreciated by those skilled in the art, the functionality of the upload server 206 can be implemented as an upload service 353 using the Microsoft Internet Server Application Programming Interface (ISAPI) to facilitate the file transfer and processing described herein.

As shown at step 352, the upload server receives session files from local computers 202 via the network 204. The session file may by transferred to the upload server 206 in a variety of ways, such as by an HTTP POST or HTTPS POST command. The number of session files received could be enormous. As a result, a software manufacturer may wish to process fewer than all session files received. Accordingly, the upload service 353 is preferably configured to direct the upload server 206 to accept only a predefined sample of the uploaded session files. The upload service 353 is configurable to accept session file retention configuration criteria 354, which, for ease of use, are provided in the Extensible Markup Language (XML) format. The XML format is well-known to those skilled in the art. For example, the specifications for XML 1.0 have been documented by the World Wide Web Consortium (W3C). Such criteria could direct, for example, that only every third session file be retained or that only those with a given data point be retained. Using the session file retention configuration criteria 354, a sampler 356 portion of the upload service 353 determines whether to retain an uploaded session file. Session files not retained are deleted at step 358 and are not further processed. If the session file meets the session file retention configuration criteria 354, the session file may be further examined at step 360 to determine whether it is in a valid format as specified by the software manufacturer. As will be appreciated by those skilled in the art, file format validity may be ascertained by reference to file header, size, checksum and similar information depending upon a manufacturer's session file format. If the criteria for a valid session file have not been met, the invalid session file is stored in reject queue 362. The manufacturer can thus collect invalid session files to determine the source of the failure.

The content of valid session files could be moved directly to processing server 210 via network 208. Alternatively, the content of valid session files is written to a transfer file by adding each newly received selected and valid session file's content onto the end of the transfer file. When a predetermined number of session files have been written to the transfer file, the upload service 353 moves the transfer file to a transfer queue 364, and session files thereafter received on upload server 206 are written to a new transfer file by the upload service 353.

In one embodiment, a staging server 366 may be provided to assist in moving the transfer files from the transfer file queue 364 to the processing server 210. The staging server is likewise preferably a data center-class Internet server running a server software, such as the Microsoft Windows 2000 Server software, although it need not be a separate computer from upload server 206. A file mover service 370 is provided, as will be appreciated by those skilled in the art, implemented using a programming language such as C++ or C#. The file mover service 370 periodically examines transfer queue 364 and, if a transfer file is present therein, the file mover service 370 transmits the transfer file from transfer queue 364 to processing server 210 via network 208. In this regard, the staging server 366 can serve as a "de-militarized zone" or DMZ-type server that provides additional security for an internal network. Moreover, transmission of a transfer file need not require that the transfer file be physically stored on the staging server 366, although such storage could certainly occur. The file mover service 370 is preferably adapted to accept transfer file configuration criteria 368 directing that transmission of the transfer file occur in accordance with the transfer file configuration criteria 368. This allows a software manufacturer to more readily control the operation of the staging server 366 or the upload server 206 by, for example, directing that certain transfer files be sent to a designated server. Transfer file configuration criteria 368 are preferably provided in the Extensible Markup Language (XML) format which provides a robust and flexible mechanism for communicating with file mover service 370. As noted above, the transfer file could be transmitted to processing server 210 by either the upload server 206 or the staging server 366. The transmitting server should be provided with sufficient disk space storage to queue data for at least the maximum length of time during which the processing server 210 could likely experience a service outage so that the transmitting server does not exhaust its disk storage capacity during an unexpected service outage.

The present invention further contemplates use of a globally unique identifier generator 351, which may be part of the upload server 206 environment, as shown in FIG. 7, or may exist in an independent environment. The globally unique identifier generator 351 provides via a network a globally unique identifier, either for a specific user or a specific local computer, as more fully discussed in connection with steps 232 and 274 above.

Figure 8:
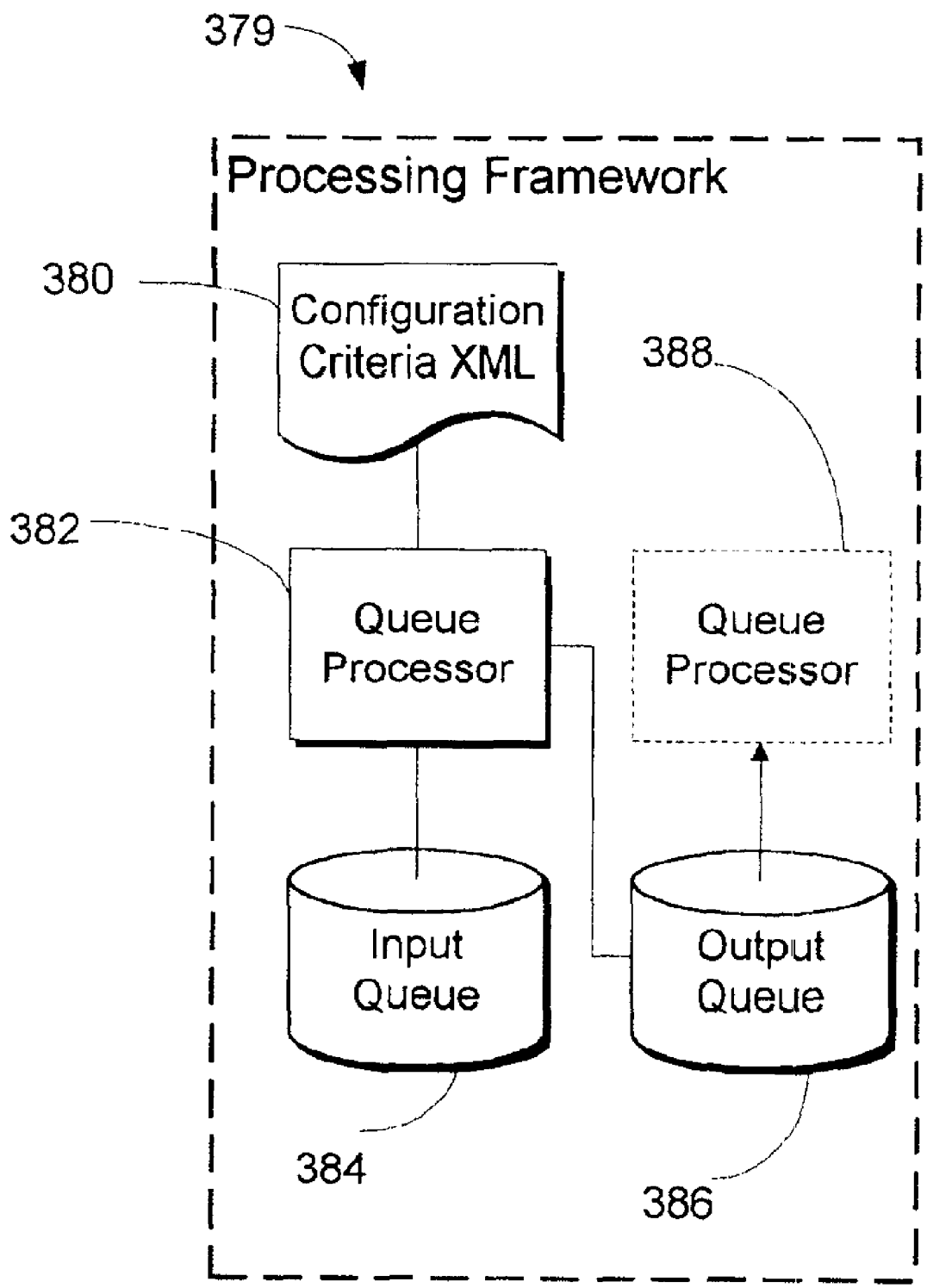
FIG. 8 is a schematic diagram and flow chart illustrating a view of the processing server.

Processing server 210 is implemented using the general processing framework 379 illustrated in FIG. 8. Information readied for processing is stored in an input queue 384. The information is processed by a queue processor 382 in a manner directed by configuration criteria 380. When the queue processor 382 has completed its process, the processed information is stored in an output queue 386, which in turn becomes an input queue for the next sequential queue processor 388. For ease of use, configuration criteria 380 are preferably provided in the Extensible Markup Language (XML) format. This process continues until the processing server has completed its analysis of the incoming transfer file. While the processing server used in the present invention could be implemented on a single computer without using a queue architecture, a distributed server environment utilizing queues offers better scalability and fault tolerance. As will be appreciated by those skilled in the art, the queues referenced herein can be implemented in a variety of ways, such as by storing queued items, or entries for such items, in a designated file directory or database table.

Figure 9:
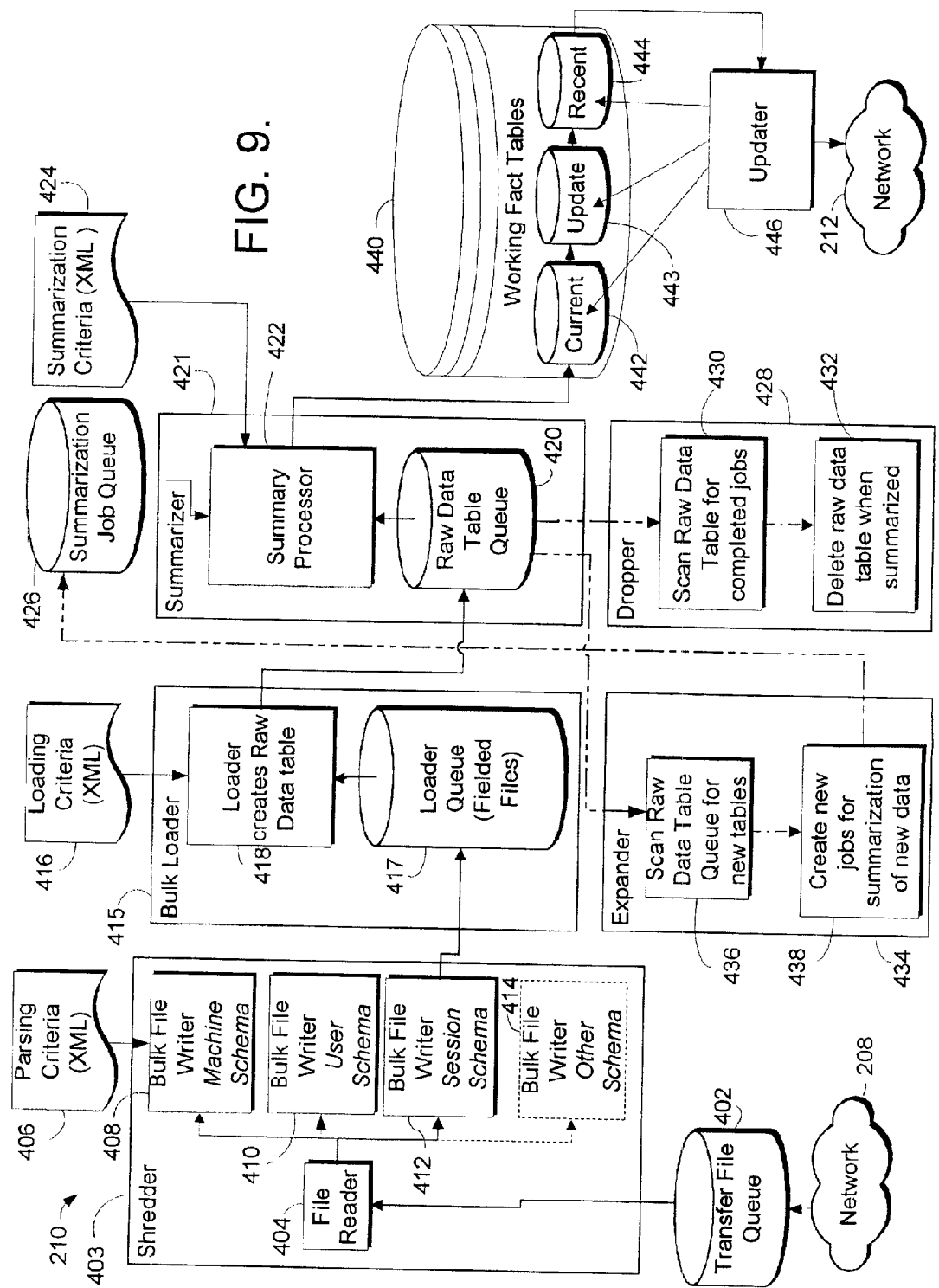
FIG. 9 is a schematic diagram and flow chart of an exemplary method for a processing server of the present invention.

An implementation of the general processing framework 379 is illustrated in FIG. 9. The processing server 210 has a network connection 208 that enables it to communicate with the upload server 206 or with the staging server 366. The processing server 210 is preferably implemented on a large-scale server computer having a network connection with a high bandwidth. As will be understood by those skilled in the art, the server may be implemented using software such as the Microsoft Windows 2000 Server and the Microsoft SQL Server executing a processing service to perform the functions described herein. The server is also preferably configured to utilize multi-threaded executions to improve throughput and to better ensure optimal processor utilization on multi-processor computers.

A transfer file is received via the network 208 into transfer file queue 402. A shredder 403 is provided as a part of the processing service to parse the incoming transfer files and to store the parsed results in a fielded file. The fielded file is one, as will be understood by those skilled in the art, capable of being readily loaded into a database table configured to store data from an instrumentation session. Thus, the fielded file could be a delimited file, such as one of comma-separated values, or could be a file wherein the data is provided in fixed-width fields.

The shredder 403 is comprised of a file reader 404 that determines whether a transfer file has been received in the transfer file queue 402 and, if so, parses the incoming transfer file in accordance with the parsing configuration criteria 406 to extract selected data as directed by the parsing configuration criteria 406. The parsing configuration criteria 406 are preferably provided in the Extensible Markup Language (XML) format. The parsing configuration criteria 406 provide the particular fields that will appear in the fielded file. The file reader 404 then moves the selected data to one or more of the bulk file writers 408, 410, 412 and 414. The bulk file writers receive the selected data and create a fielded file as applicable. An incoming transfer file may contribute data to more than one bulk file writer. Thus, a bulk file writer machine schema 408 may be provided to create a fielded file of information relating to the local computers from which instrumentation session data was obtained. A bulk file writer user schema 410 could be provided to create a fielded file of information relating to the users from which instrumentation session data was obtained. Similarly, a bulk file writer session schema 412 could be employed to create a fielded file that relates to specific instrumentation sessions. A bulk file writer for another schema 414 could likewise be provided to allow creation of a fielded file in a manner otherwise desired by a software manufacturer.

Completed fielded files are stored in loader queue 417, which is implemented as part of bulk loader 415. The bulk loader 415 accepts fielded files from the shredder 403 and loads the fielded files into a raw data table, such as a table in a Microsoft SQL database. The fields of the table can correspond to the data point measurements contained in the fielded file. In operation, loader 418, which is part of bulk loader 415, examines loader queue 417 and, if a fielded file is present therein, processes the fielded file to create a raw data table having fields populated corresponding to the information in the fielded file. The information is loaded into the raw data table in accordance with loading configuration criteria 416, which are preferably provided in the Extensible Markup Language (XML). For example, the loading configuration criteria 416 may provide the fields or data in a fielded file to be loaded into a raw data table. The bulk loader 415 then stores the raw data table in the raw data table queue 420. The bulk loader service 415 could be implemented as a part of the processing service on processing server 210. As will be understood by those skilled in the art, the data from a fielded file could be loaded into the raw data table in a number of ways, such as by using a Bulk Insert operation provided by the Microsoft SQL Server product. Each row in the raw data table will contain data for one instrumentation session as written by the applicable bulk file writer. The summary processor 422 could be further adapted to quantitize the information in the fielded file for later ease of analysis and reporting. Such quantitization information could be provided in loading criteria 416.

The raw data table queue 420 is part of the summarizer 421, which can be implemented as a part of the processing service on processing server 210. The summarizer 421 contains a summary processor 422 that examines the content of the raw data table queue 420. If a raw data table is present, the summary processor 422 creates a summary of the raw data table. For example, such a summary could be generated using SQL statements to summarize the raw instrumentation session data by day and application. Thus, a possible summarization command using a structured query language (SQL) query could be:

SELECT date, application name, SUM(ClicksCopy)
FROM RawDataTable
GROUP BY day, application name Such a command would produce a single line for a given date and application that summed the ClicksCopy variable values from a potentially large number of entries in a raw data table. Many summarizations could be run on each raw data table to produce desired summaries. Each summary should result in a full scan of the raw data table to ensure completeness. As will be appreciated by those skilled in the art, the summarizations contemplated by the present invention could be performed in a variety of other ways. The results of the summaries are placed in a working fact table 440, such as in a current data table 442, which is one of the working fact tables 440, which also include the update data table 443 and the recent results data table 444. Each of the working fact tables 440 is a database table, such as a table created using the Microsoft SQL Server product. The fields in working fact tables 440 can correspond to the data being summarized and could include additional fields.

The raw data table is summarized in accordance with the summarization configuration criteria 424, which are preferably provided in the Extensible Markup Language (XML). To further streamline the summarizer 421 processing, a summarization job queue 426 is preferably provided along with an expander 434 and a dropper 428. The summarization job queue 426 stores information about raw data tables awaiting summarization and is in communication with the expander 434. The dropper 432 scans the raw data table queue 420 for raw data tables that have been fully summarized at step 430. If all summarizations for a given raw data table have been completed, the dropper 432 deletes that raw data table at step 432 from raw data table queue 420. The expander 434 likewise scans the raw data table queue for newly added raw data tables at step 436 and, upon finding a new table, creates a job entry for each new summarization job associated with the given raw data table in the summarization job queue 426 at step 438. Use of a summarization job queue 426, while not required, can better ensure that all raw data tables are properly summarized.

Since instrument session data is summarized shortly after it is received, it would be possible to have multiple fielded files containing data about which a single summary was desired. For example, two fielded files could be received having data from different instrumentation sessions on the same day whereby a daily summary is desired. The summary processor 421 would initially create at least two rows in a raw data table, one per fielded file, summarizing the desired variable for the same day. These duplicative rows would be added to current data table 442. To eliminate these redundant rows in the current data table 442, the summarizer 421 preferably performs a secondary summarization on the current data table 442 to further summarize the data therein to combine into a single row those rows in the current data table 442 having identical summarization criteria. The results of this secondary summarization are placed in the update data table 443 or, optionally, in the recent results data table 444.

An updater 446 is provided as part of the processing service running on processing server 210. The updater 446 performs several functions. It determines whether there are any rows in the recent data table 444 that match a row in the update data table 443. If such a match exists, the updater 446 updates the row in the recent data table 444 based on the matching row in the update data table 443. The updater 446 further scans the update data table 443 to determine whether there are any new rows therein that are not present in the recent data table 444. If such new rows exist, the updater 446 copies such new rows to the recent data table 444. The updater 446 then transmits the recent fact table 444, or other applicable working fact table 440, via the network 212 to the data warehouse server 214 so that the data from the working fact table can be included in at least one of the main fact tables 460.

Figure 10:
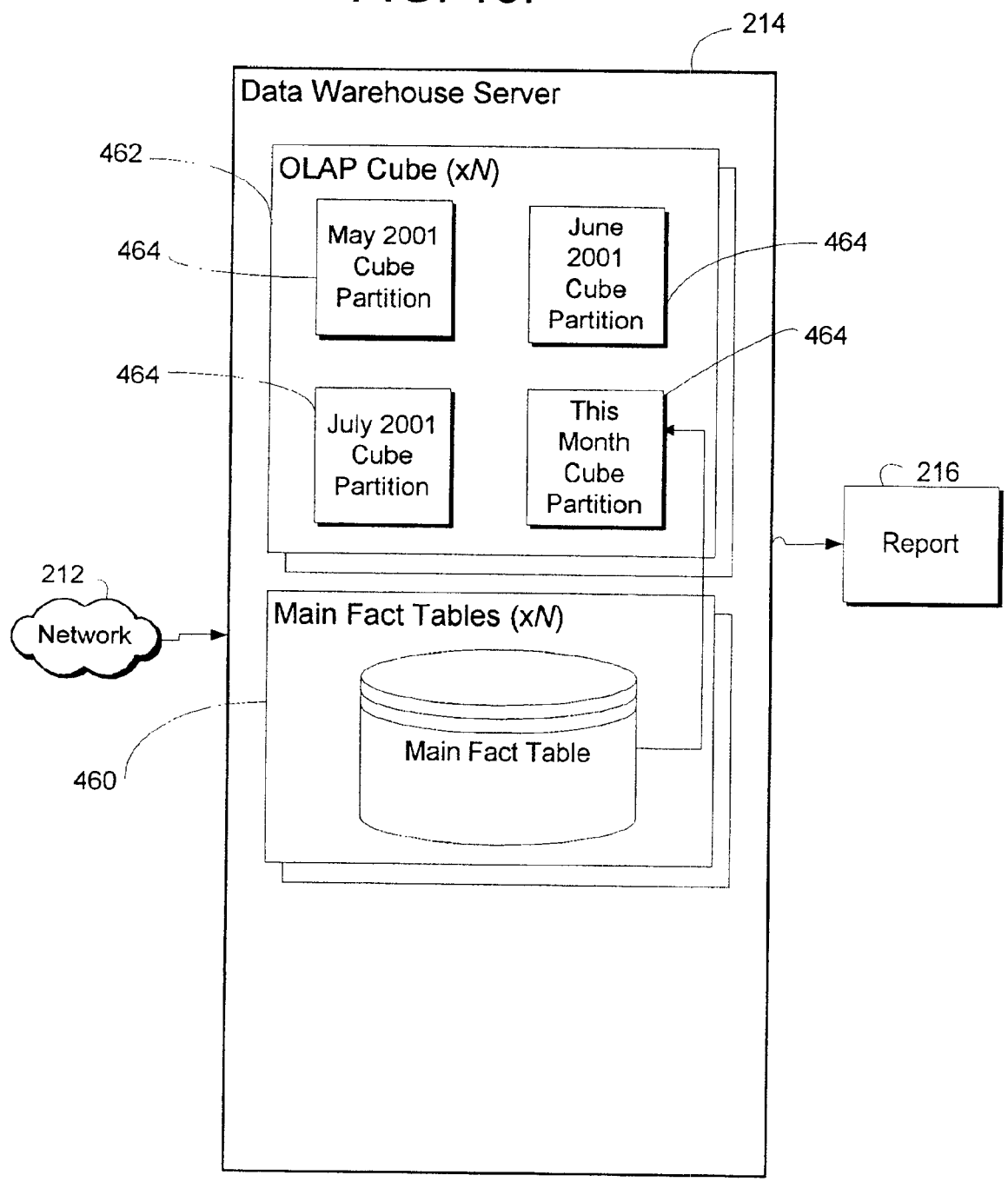
FIG. 10 is a schematic diagram and flow chart illustrating the method of the data warehouse server portion of the present invention.

As will be appreciated by those skilled in the art, a data warehouse server 214 can be implemented using the online analytical processing (OLAP) architecture. For example, the Microsoft Analysis Services product could be used to enable the OLAP analyses described herein. As shown in FIG. 10, such an architecture provides for main fact tables 460 and OLAP cubes 462 organized around one or more particular facts, such as the processor speed of the local computer 202 used during an instrumentation session. The OLAP cubes 462 may be further segregated into cube partitions 464 that are data tables that reflect the desired fact for a given time period, such as during a given month. In this way, a report 216 can be generated using the data as organized in the data warehouse server 214 and a report application, such as Microsoft Excel, to view the data in a desired format.

The invention can be seen to provide software manufacturers with valuable information regarding how a population of its users use a given application. The invention provides this information in an automated manner that can be easily updated and reviewed. Moreover, additional parameters can easily be added as the manufacturer issues an updated version of an application that are instrumented to measure such parameters. By obtaining current, comprehensive information about a parameter regarding how customers use an application, the software manufacturer can provide more effective product improvements in a shorter time.

Alternative embodiments of the present invention become apparent to those skilled in the art to which it pertains upon review of the specification, including the drawing figures. The various computer systems and components shown in FIGS. 1–10 and described in the specification are merely exemplary of those suitable for use in connection with the present invention. Accordingly, the scope of the present invention is defined by the appended claims rather than the foregoing description.

We claim:

1. A method for collecting data about a local computer, comprising:

initiating an instrumentation session by executing on the local computer an application programmed to measure a parameter concerning the local computer;

obtaining an identifier for association with the instrumentation session on the local computer;
measuring the parameter during the instrumentation session to obtain a value;
creating a data point identifying the parameter and the value; and
storing the data point on the local computer to create a set of data points associated with the instrumentation session and with the identifier.

2. The method of claim 1, further comprising:
ending the instrumentation session; and
storing the set of data points and the identifier in a session file on a local storage device accessible by the local computer.

3. The method of claim 1, wherein the step of obtaining an identifier further comprises obtaining a globally unique identifier corresponding to a specific user.

4. The method of claim 1, wherein the step of obtaining an identifier further comprises obtaining a globally unique identifier corresponding to the local computer.

5. The method of claim 2, further comprising directing the local computer to transmit the session file to a remote computer via a network.

6. The method of claim 5, further comprising determining whether the step of directing the local computer to transmit the session file resulted in transmitting the session file to the remote computer and, if so, deleting the session file from the local storage device.

7. A computer-readable medium having computer-executable instructions for performing the method recited in claim 1.

8. A computer system having a processor, a memory, and an operating environment, the computer system operable to execute the method recited in claim 1.

9. A method for collecting data about a local computer, comprising:
initiating a current instrumentation session by executing on the local computer an application programmed to measure a parameter concerning the local computer;
obtaining an identifier for association with the current instrumentation session on the local computer;
measuring the parameter during the current instrumentation session to obtain a value;
creating a data point identifying the parameter and the value;
storing the data point on the local computer to create a set of data points associated with the current instrumentation session and with the identifier;
ending the current instrumentation session;
storing the set of data points and the identifier in a current session file on a local storage device accessible by the local computer;
directing the local computer to transmit the current session file to a remote computer via a network; and
determining whether the step of directing the local computer to transmit the current session file resulted in transmitting the current session file to the remote computer and, if so, deleting the current session file from the local storage device.

10. The method of claim 9, wherein the step of obtaining an identifier further comprises obtaining a globally unique identifier corresponding to a specific user.

11. The method of claim 9, wherein the step of obtaining an identifier further comprises obtaining a globally unique identifier corresponding to the local computer.

12. The method of claim 9, further comprising:
determining whether a session file created during a previous instrumentation session exists on the local storage device and, if so, directing the local computer to transmit the previous session file to the remote computer via the network; and
determining whether the step of directing the local computer to transmit the previous session file resulted in transmitting the previous session file to the remote computer and, if so, deleting the previous session file from the local storage device.

13. A computer-readable medium having computer-executable instructions for performing the method recited in claim 9.

14. A computer system having a processor, a memory, and an operating environment, the computer system operable to execute the method recited in claim 9.

15. A method for collecting data about a local computer, comprising:
initiating a current instrumentation session by executing on the local computer an application programmed to measure a parameter concerning the local computer and to access an on-line service;
presenting a screen to a user enabling the user to gain access to the on-line service;
obtaining an identifier for association with the current instrumentation session on the local computer;
measuring the parameter during the current instrumentation session to obtain a value;
creating a data point identifying the parameter and the value;
storing the data point on the local computer to create a set of data points associated with the current instrumentation session and with the identifier;
ending the current instrumentation session;
storing the set of data points and the identifier in a current session file on a local storage device accessible by the local computer;
directing the local computer to transmit the current session file to a remote computer via a network; and
determining whether the step of directing the local computer to transmit the current session file resulted in transmitting the current session file to the remote computer and, if so, deleting the current session file from the local storage device.

16. The method of claim 15, further comprising:
determining whether a session file created during a previous instrumentation session exists on the local storage device and, if so, directing the local computer to transmit the previous session file to the remote computer via the network; and
determining whether the step of directing the local computer to transmit the previous session file resulted in transmitting the previous session file to the remote computer and, if so, deleting the previous session file from the local storage device.

17. The method of claim 15, wherein the step of obtaining an identifier further comprises obtaining a globally unique identifier corresponding to a specific user.

18. The method of claim 15, wherein the step of obtaining an identifier further comprises obtaining a globally unique identifier corresponding to the local computer.

19. A computer-readable medium having computer-executable instructions for performing the method recited in claim 15.

20. A computer system having a processor, a memory, and an operating environment, the computer system operable to execute the method recited in claim 15.

21. In a networked computer environment having an upload server and a processing server, a method for analyzing data collected about local computers, comprising:

receiving on the upload server session files from the local computers, each of the session files containing an identifier and a set of data points associated with an instrumentation session;

transmitting the content of the session files to the processing server;

storing the content of the session files in a fielded file;

providing loading configuration criteria;

loading the fielded file into a raw data table in accordance with the loading configuration criteria;

providing summarization configuration criteria;

analyzing the raw data table to produce a summary of the information in the raw data table in accordance with the summarization configuration criteria; and storing the summary in a working fact table.

22. The method of claim 21, wherein the step of providing loading configuration criteria further comprises providing loading configuration criteria in the Extensible Markup Language (XML) format.

23. The method of claim 21, wherein the step of providing summarization configuration criteria further comprises providing summarization configuration criteria in the Extensible Markup Language (XML) format.

24. A computer-readable medium having computer-executable instructions for performing the method recited in claim 21.

25. A computer system having a processor, a memory, and an operating environment, the computer system operable to execute the method recited in claim 21.

26. In a networked computer environment having an upload server, a processing server and a data warehouse server, a method for analyzing data collected about local computers, comprising:

receiving on the upload server session files from the local computers, each of the session files containing an identifier and a set of data points associated with an instrumentation session;

providing retention configuration criteria;

determining whether each of the session files satisfies the retention configuration criteria and, if so, storing the content of the session files satisfying the retention configuration criteria in a transfer file;

providing transfer file configuration criteria;

transmitting the transfer file via the network from the upload server to the processing server in accordance with the transfer file configuration criteria;

providing parsing configuration criteria;

parsing the transfer file on the processing server in accordance with the parsing configuration criteria to extract selected data;

storing the selected data in a fielded file;

providing loading configuration criteria;

loading the fielded file into a raw data table in accordance with the loading configuration criteria;

providing summarization configuration criteria;

analyzing the raw data table to produce a summary of the information in the raw data table in accordance with the summarization configuration criteria;

storing the summary in a working fact table; and transmitting the working fact table to the data warehouse server for inclusion in a main fact table for use in an on-line analytical processing environment.

27. The method of claim 26, wherein the step of providing retention configuration criteria includes providing the retention configuration criteria in the Extensible Markup Language (XML) format.

28. The method of claim 26, wherein the step of providing transfer file configuration criteria includes providing the transfer file configuration criteria in the Extensible Markup Language (XML) format.

29. The method of claim 26, wherein the step of providing parsing configuration criteria further comprises providing the parsing configuration criteria in the Extensible Markup Language (XML) format.

30. The method of claim 26, wherein the step of providing loading configuration criteria further comprises providing the loading configuration criteria in the Extensible Markup Language (XML) format.

31. The method of claim 26, wherein the step of providing summarization configuration criteria further comprises providing the summarization configuration criteria in the Extensible Markup Language (XML) format.

32. A computer-readable medium having computer-executable instructions for performing the method recited in claim 26.

33. A computer system having a processor, a memory, and an operating environment, the computer system operable to execute the method recited in claim 26.

34. In a networked computer environment having an upload server, a staging server, a processing server and a data warehouse server, a method for analyzing data collected about local computers, comprising:

receiving on the upload server session files from the local computers, each of the session files containing an identifier and a set of data points associated with an instrumentation session;

providing retention configuration criteria;

determining whether each of the session files satisfies the retention configuration criteria and, if so, storing the content of the session files satisfying the retention configuration criteria in a transfer file located in a transfer queue;

providing transfer file configuration criteria;

directing the staging server to transmit the content of the transfer queue via the network to the processing server in accordance with the transfer file configuration criteria;

providing parsing configuration criteria;

parsing the transfer file on the processing server in accordance with the parsing configuration criteria to extract selected data;

storing the selected data in a fielded file located in a loader queue;

providing loading configuration criteria;

loading the fielded file into a raw data table in accordance with the loading configuration criteria;

storing the raw data table in a raw data table queue;

providing summarization configuration criteria;

analyzing the raw data table in the raw data table queue to produce a summary of the information in the raw data table in accordance with the summarization configuration criteria;

storing the summary in a working fact table; and transmitting the working fact table to the data warehouse server for inclusion in a main fact table for use in an on-line analytical processing environment.

35. The method of claim 34, wherein the step of providing retention configuration criteria further comprises providing the retention configuration criteria in the Extensible Markup Language (XML) format.

36. The method of claim 34, wherein the step of providing transfer file configuration criteria further comprises providing the transfer file configuration criteria in the Extensible Markup Language (XML) format.

37. The method of claim 34, wherein the step of providing parsing configuration criteria further comprises providing the parsing configuration criteria in the Extensible Markup Language (XML) format.

38. The method of claim 34, wherein the step of providing loading configuration criteria further comprises providing the loading configuration criteria from in the Extensible Markup Language (XML) format.

39. The method of claim 34, wherein the step of providing summarization configuration criteria further comprises providing the summarization configuration criteria in the Extensible Markup Language (XML) format.

40. A computer-readable medium having computer-executable instructions for performing the method recited in claim 34.

41. A computer system having a processor, a memory, and an operating environment, the computer system operable to execute the method recited in claim 34.

* * * * *

UNITED STATES PATENT AND TRADEMARK OFFICE
CERTIFICATE OF CORRECTION

PATENT NO. : 6,901,536 B2
DATED : May 31, 2005
INVENTOR(S) : Benjamin P. Davenport et al.

It is certified that error appears in the above-identified patent and that said Letters Patent is hereby corrected as shown below:

Title page,
Item [75], Inventors, should read
-- Benjamin P. Davenport, Seattle, WA
  Shawn M. Murphy, Redmond, WA
  Walter R. Smith, Seattle, WA --.

Signed and Sealed this

Thirtieth Day of August, 2005

JON W. DUDAS
*Director of the United States Patent and Trademark Office*